US005100576A

United States Patent [19]

Cramer et al.

[11] Patent Number: 5,100,576

[45] Date of Patent: Mar. 31, 1992

[54] PROCESS FOR THE PREPARATION OF A READILY SOLUBLE BLEACH ACTIVATOR GRANULATE WITH A LONG SHELF LIFE

[75] Inventors: Jürgen Cramer, Eppstein/Taunus; Helmut Kramer, Mainz; Gerhard Nöltner, Frankfurt am Main; Wilfried Schuler, Limburg, all of Fed. Rep. of Germany

[73] Assignee: Hoechst Aktiengesellschaft, Frankfurt am Main, Fed. Rep. of Germany

[21] Appl. No.: 454,163

[22] Filed: Dec. 21, 1989

[30] Foreign Application Priority Data

Dec. 22, 1988 [DE] Fed. Rep. of Germany ....... 3843195

[51] Int. Cl.[5] .................................... C09K 3/00

[52] U.S. Cl. .......................... 252/186.25; 252/186.38

[58] Field of Search ...................... 252/186.25, 186.38, 252/186.39

[56] References Cited

U.S. PATENT DOCUMENTS

| | | | |
|---|---|---|---|
| 3,163,606 | 12/1964 | Viveen et al. | 252/98 |
| 3,789,002 | 1/1974 | Weber et al. | 252/99 X |
| 4,372,868 | 2/1983 | Saran et al. | 252/186.41 |
| 4,399,049 | 8/1983 | Gray et al. | 252/186.25 |
| 4,457,858 | 7/1984 | Saran et al. | 252/186.38 |
| 4,678,594 | 7/1987 | Parfomak et al. | 251/186.31 |
| 4,921,631 | 5/1990 | Gradwell et al. | 252/186.38 |

FOREIGN PATENT DOCUMENTS

| | | |
|---|---|---|
| 0037026 | 10/1981 | European Pat. Off. . |
| 0062523 | 10/1982 | European Pat. Off. . |

*Primary Examiner*—Robert L. Stoll
*Assistant Examiner*—Joseph D. Anthony

[57] ABSTRACT

A pulverulant, dry bleach activator, in particular tetraacetylethylenediamine is first moistened with water and then mixed with a dry auxiliary, in particular, with Na carboxymethylcellulose. This mixture is then granulated.

9 Claims, No Drawings

PROCESS FOR THE PREPARATION OF A READILY SOLUBLE BLEACH ACTIVATOR GRANULATE WITH A LONG SHELF LIFE

DESCRIPTION

Process for the preparation of a readily soluble bleach activator granulated with a long shelf life.

Bleach activators react even in the washing powder mixture, favoured by the residual moisture present, with the bleaching agent, such as, for example, sodium perborate, if both components are unprotected. In order to prevent this reaction, one of the two components is coated with a water-soluble agent which dissolves in the washing water during the washing process and liberates the active substance. To this end, the bleach activator is preferably coated. Water-soluble agents used here are, for example, surfactants which are solid at room temperature, as described in EP 62,523, or derivatives of starch or cellulose, as described in EP 37,026. Since the derivatives of starch or cellulose swell during the dissolution process, there is an additional disintegrant effect which breaks up the agglomerates produced on coating, more rapidly into the individual crystals and thus makes the activator action available more quickly. In the process of EP 37,026, all or some of the activator powder is first pre-mixed in dry form with the auxiliary. In a second step, this mixture is then moistened with water or with an aqueous solution of the remainder of the auxiliary and granulated. In EP 62,523, the preparation of the activator granulates takes place by extrusion of a mixture of activator and surfactant.

One of the important factors for the stability and thus also for the effectiveness of the coated particles is therefore that the coating must be as closed as possible, and that the coating agent is distributed as uniformly as possible over the activator substance. However, this is not achieved using the process described in EP 37,026, since the derivatives of starch or cellulose form a jelly on introduction into the powder mixture of the water necessary for initial dissolution of the derivatives of starch or cellulose, the jelly not being sufficiently flowing to completely envelope the activator particles.

It has now been found that a uniform covering of the activator particles with the derivatives of starch or cellulose is achieved if the activator is first moistened with the necessary amount of water and the pulverulent derivatives of starch or cellulose are then metered in.

The present invention thus relates to a process for the preparation of a readily soluble bleach activator granulate with a long shelf life by coating &.he activator with an auxiliary, the pulverulent activator first being moistened with water, the auxiliary subsequently being mixed as a powder with the moist activator, and this mixture being granulated.

Suitable bleach activators for the process according to the invention are N-actylated amines, diamines, amides and glycolurils, which are known for this purpose, preferably tetraacetylethylenediamine and tetracetylglycolurile, and pentaacetylglucose and sodium isononanoyloxybenzenesulfonate. When prepared, these activators are produced as powders. In order to ensure good dissolution of the activator in the washing liquor, it has proven expedient to preferably use activators which have a mean grain diameter of from about 0.05 to 0.5 mm, in particular from 0.07 to 0.2 mm. The mean grain diameter desired can be achieved by screening using calibrated screens. However, the process according to the invention is not limited to the processing of particles of the grain sizes indicated.

The amount of water applied to the activator in the first step by customary methods, for example by spraying, should be such that a moist granulate which does not yet tend to bake together is produced. In general, the activator powder is moistened with water in the ratio 20:1 to 4:1, preferably in the ratio 9:1 to 5:1.

If desired, a dye or a white pigment can be added to the dry activator or the water to provide colouring or to cover the inherent colour of the raw materials. In general, 0.01 to 0.1 percent by weight, based on the finished product, of dye or coloured pigment are sufficient for this purpose.

The activator powder moistened in this way is subsequently mixed with the auxiliary necessary, for coating the activator. Suitable auxiliaries for this purpose are water-soluble cellulose ethers, water-soluble starch or water-soluble starch ethers. Examples of cellulose ethers are methylcellulose, ethylcellulose, hydroxyethylcellulose, methylhydroxyethylcellulose, methylhydroxypropylcellulose, carboxymethylcellulose (as the sodium salt) and methylcarboxymethylcellulose (Na salt). A suitable starch is, for example, depolymerised starch. Suitable starch ethers are, for example, carboxymethyl starch, hydroxyethyl starch and methyl starch. Sodium carboxymethyl cellulose has proven particularly suitable. All these products are mixed in dry form with the activator. The mixing of the moist activator with the pulverulent, dry auxiliary takes place in customary mixing equipment. About 2 to 20% by weight of auxiliary, based on the dry activator powder, are mixed into the moist activator powder.

In order to accelerate the dissolution process on later application, small amounts of known, pulverulent disintegrants which are customary in the tablet industry can also be added so long as the cellulose ethers and the starch ethers employed do not themselves develop a certain disintegrant action. Disintegrants which can be used are, for example, partially degraded starch, starch ethers, polyvinylpolypyrrolidone, formaldehydecasein and swellable magnesium alumosilicates. The proportion of disintegrants of this type can be 0 to 2 percent by weight of the finished granulate.

The mixture obtained in this way is then granulated in a suitable granulator, for example in a granulation drum, in a high-speed mixer or on a granulation plate. Furthermore, equipment for compression granulation is also suitable, such as, for example, extrusion or annular chaser pressing.

The water content of the mixture is subsequently reduced to less than 2, preferably less than 1, percent by weight. The excess water can be removed by drying with supply of heat, the temperature of the granulate expediently not exceeding 100° C. and being below the melting point of the bleach activator. The dried granulates should contain less than 2, preferably less than 1, percent by weight of water.

If the granulate is intended for later use in washing agents or is intended to be used for washing purposes which are not subject to interference by a certain content of salts which are usually employed in washing agents or in washing processes and which are capable of crystallising while taking up water of crystallisation, the excess water can also be removed by mixing moist granulates with such water-removing, essentially anhydrous or low-water salts. Examples of such salts are sodium tripolyphosphate, sodium sulfate, sodium carbonate, sodium silicate and low-water sodium alumosilicates which are capable of ion exchange, and mixtures thereof. The amount to be used depends on the water-binding capacity of the relevant salts and on the water content of the moist granulate. In the case of anhydrous sodium tripolyphosphate, which is preferably employed, the mixing ratio between tripolyphosphate and moist granulate is 1:3 to 1:1.5, in particular 1:2 to 1:1. The mixing can be carried out in customary mixers or granulators, it also being possible to immediately further use the mixing equipment fitted with mixing attachments and used for the preparation of the moist granulates. In this way, simplified, in particular energy-saving processing is possible since the dry step which is necessary, ca be omitted.

In addition, it is possible, for use in washing agents or in granulates intended for washing processes, to also add, during the granulation process, substances which are usually admixed separately in a very small amount with the washing agents in a separate mixing process. These additives are those which are deactivated or lost during customary washing agent preparation, in particular during hot-spray drying such as foam inhibitors and fragrances. Suitable foam inhibitors are customary, known antifoaming agents, preferably polysiloxanes admixers thereof with microfine silica. Examples of these are polydimethylsiloxane containing about 1-10 percent by weight of microfine silica. The proportion of polysiloxane antifoams of this type can be 1 to 5 percent by weight, preferably 2 to 4 percent by weight, based on the finished granulate.

The bleach activators obtained in this way and coated with an auxiliary exhibit significantly, better stability on storage compared with the activators of an analogous structure obtained by the process of EP-A 37,026.

EXAMPLE 1

11.8 g of TAED (tetraacetylethylenediamine) powder having a mean grain diameter d of about 85 μ were moistened with 1.87 l of water in 60 seconds in a mixer with a high-speed stirrer, then 800 g of carboxymethylcellulose powder were metered in over 90 seconds immediately thereafter. The resultant mixture was passed through a perforated sheet having 1 mm holes and dried to a residual moisture content of 0.2%.

The granulate obtained in this way was mixed to 3% in a standard washing powder mixture containing sodium perborate and stored for 30 days at 38° C. and a relative humidity of 80% in a temperature- and humidity-controlled chamber. After this, 83% of the initial activity which could be detected titrimetrically were still present.

EXAMPLE 2

7 14 kg of TAED powder per minute were mixed with 2.8 l of water per minute in a continuous mixer, the moist mixture was introduced continuously into a second mixer having a high-speed stirrer, and 0.7 kg of carboxymethylcellulose were simultaneously metered in per minute.

The moist granulate produced in this process was dried in a fluidised bed dryer to a residual moisture content of about 1%. About 3.5% of the granulate then discharged from the dryer were larger than 1400 μ and about 26% were smaller than 500 μ. The acceptable grain (components between 500 μ and 1400 μ) was screened off and mixed to 3% in a standard washing powder mixture containing sodium perborate. After storage for 30 days at 38° C. and a relative atmospheric humidity of 80%, 79% of the initial activity which could be determined titrimetrically were still present.

COMPARISON EXAMPLE

A powder mixture comprising 11.8 kg of TAED and 800 g of carboxymethylcellulose were moistened in 60 seconds with 1.87 l of water in a mixer having a high-speed stirrer. The resultant mixture was passed through a perforated sheet having 1 mm holes and dried to a residual moisture content of 0.2%. The granulate obtained in this way was mixed to 3% in a standard washing powder mixture containing perborate and stored for 30 days at 38° C. and a relative humidity of 80% in a temperature- and humidity-controlled chamber. 66% of the initial activity which could be determined titrimetrically were then still present.

We claim:

1. A process for the preparation of a readily soluble activator granulate with a long shelf life and a water content less than 2 percent by weight, by coating the activator with an auxiliary, which comprises first moistening the pulverulent activator with water and subsequently mixing the auxiliary, as a powder, with the moist activator and granulating this mixture.

2. The process as claimed in claim 1, wherein the activator powder is moistened with water in the ratio 20:1 to 4:1.

3. The process as claimed in claim 1, wherein 2 to 20% by weight of the auxiliary, based on the dry activator powder, are mixed into the moist activator powder.

4. The process as claimed in claim 1, wherein sodium carboxymethylcellulose is employed as the auxiliary.

5. The process as claimed in claim 1, wherein said activator is selected from the group consisting of tetra-acetylethylenediamine, tetra-acetylglycolurile, penta-acetylglucose and sodium isononanoyloxybenzenesulfonate.

6. The process as claimed in claim 1, wherein said activator has a mean grain diameter ranging from 0.05 mm to 0.5 mm.

7. The process as claimed in claim 1, wherein said activator has a mean grain diameter ranging from 0.07 mm to 0.2 mm.

8. The process as claimed in claim 1, wherein the activator powder is moistened with water in the ratio 9:1 to 5:1.

9. The process as claimed in claim 1, wherein said auxiliary is selected from the group consisting of methylcellulose, ethylcellulose, hydroxyethylcellulose, methylhydroxyethylcellulose, methylhydroxypropylcellulose, carboxymethylcellulose, methylcarboxymethylcellulose, depolymerised starch, carboxymethyl starch, hydroxyethyl starch or methyl starch.

* * * * *